United States Patent [19]

Prather et al.

[11] 4,029,348
[45] June 14, 1977

[54] SELF-LOCKING DEVICES

[75] Inventors: Joseph E. Prather, Bernardsville; Ramzi A. Khalifa, Rutherford, both of N.J.

[73] Assignee: Edson Tool and Manufacturing Company, Inc., Belleville, N.J.

[22] Filed: Apr. 13, 1976

[21] Appl. No.: 676,509

[52] U.S. Cl. .............................. 292/241; 292/198; 292/202; 292/DIG. 72
[51] Int. Cl.² ......................................... E05C 3/04
[58] Field of Search ........... 292/241, DIG. 72, 218, 292/198, 304, 202

[56] References Cited

UNITED STATES PATENTS

| 989,695 | 4/1911 | Clark | 292/241 |
|---|---|---|---|
| 2,236,594 | 4/1941 | Dwyer | 292/241 |
| 2,260,519 | 10/1941 | Haseltine | 292/218 |
| 2,451,537 | 10/1948 | Dath | 292/241 |

Primary Examiner—Paul R. Gilliam
Assistant Examiner—Kenneth J. Dorner
Attorney, Agent, or Firm—Alexander T. Kardos

[57] ABSTRACT

An improved self-locking device for locking a movable structural member to a stationary structural member, or to another movable structural member, or for unlocking the same, comprising a rotatable self-locking cam and an actuating means therefor; the rotatable self-locking cam being rotatably mounted on a first structural member and having (1) an arcuate surface thereon, capable of preventing movement of a movable structural member in a first or opening direction, and (2) a cam surface thereon, capable of moving the movable structural member in the first or opening direction; and the actuating means being capable of rotating the self-locking cam in an angular direction whereby the cam surface contacts an ear on the movable structural member to forcibly move it in the first or opening direction, while the arcuate surface is being simultaneously moved out of the way of the movable structural member, due to the angular rotation of the self-locking cam, to permit the movement of the movable structural member in the first or opening direction to unlock the movable structural member from the first structural member, and then, the ear on the movable structural member being subsequently capable of rotating the self-locking cam in an angular direction opposite to that of the first angular direction, whereby the movable structural member returns to its original locked position, wherein it is prevented from moving in the first or opening direction by the arcuate surface on the rotatable self-locking cam.

16 Claims, 13 Drawing Figures

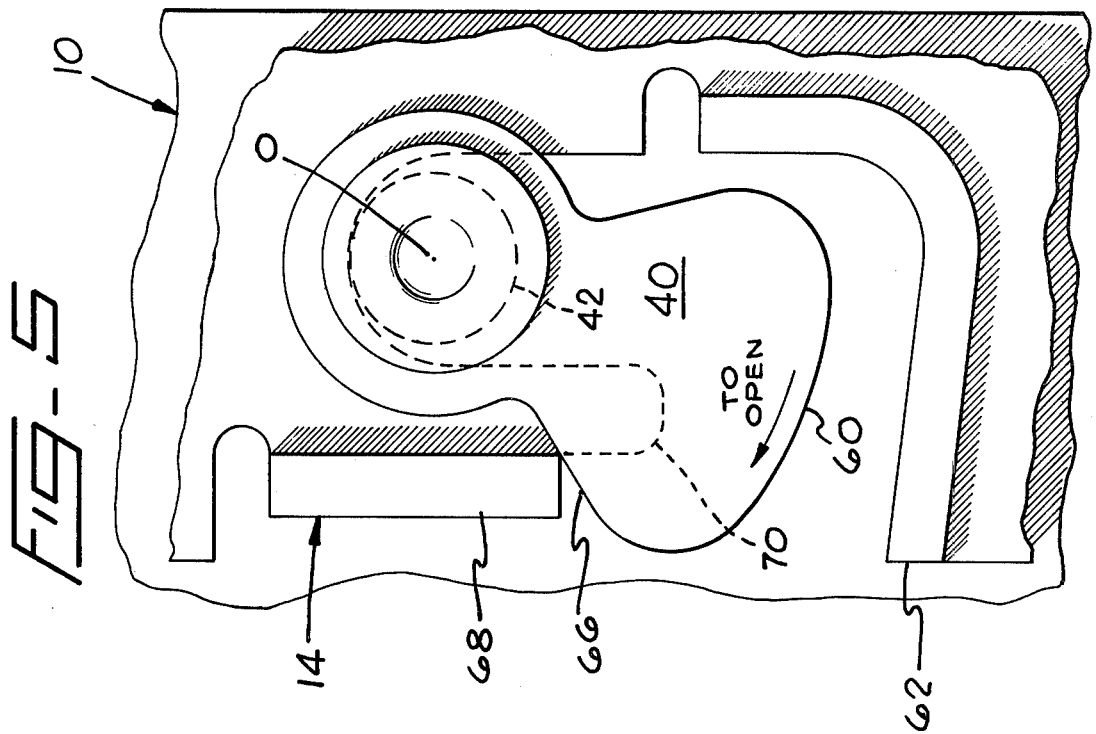
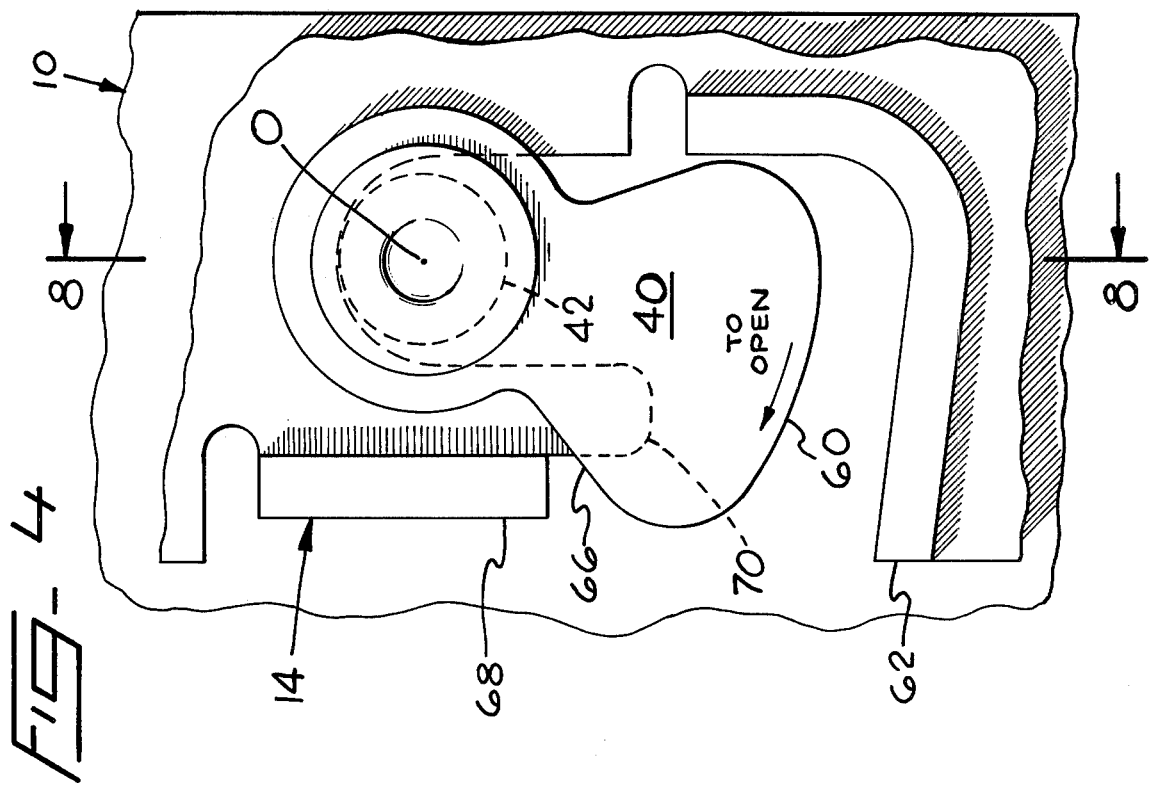

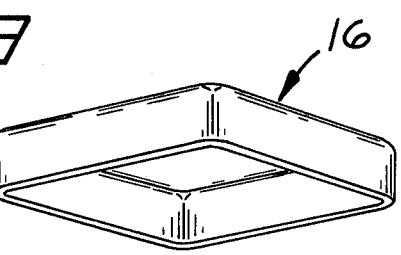
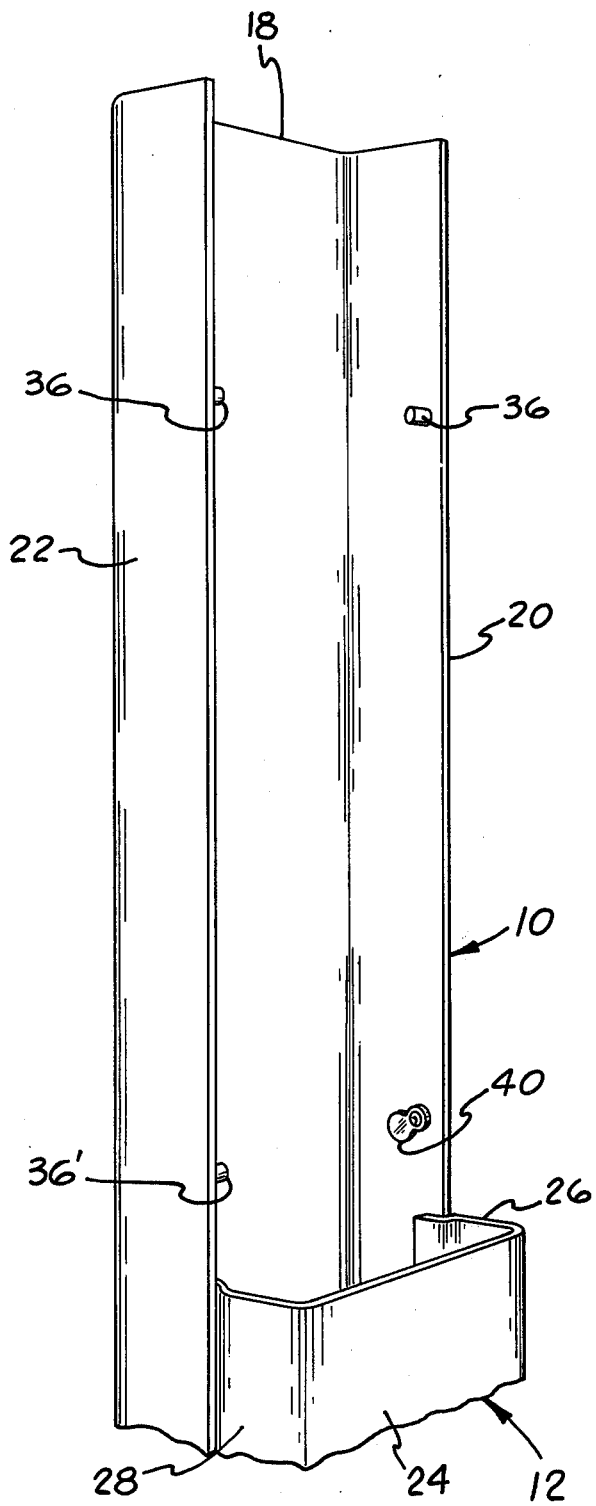
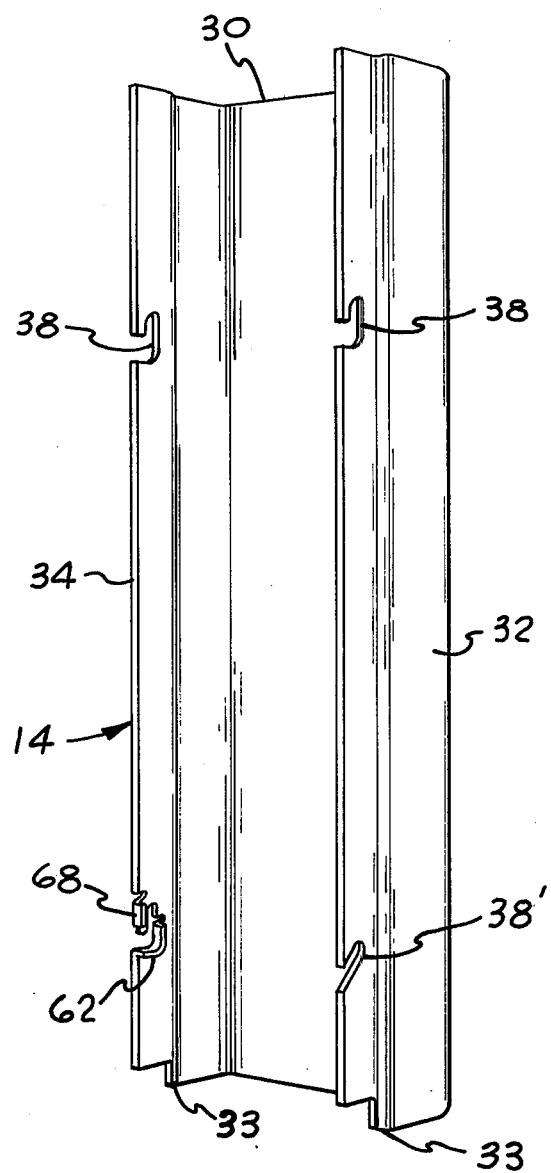

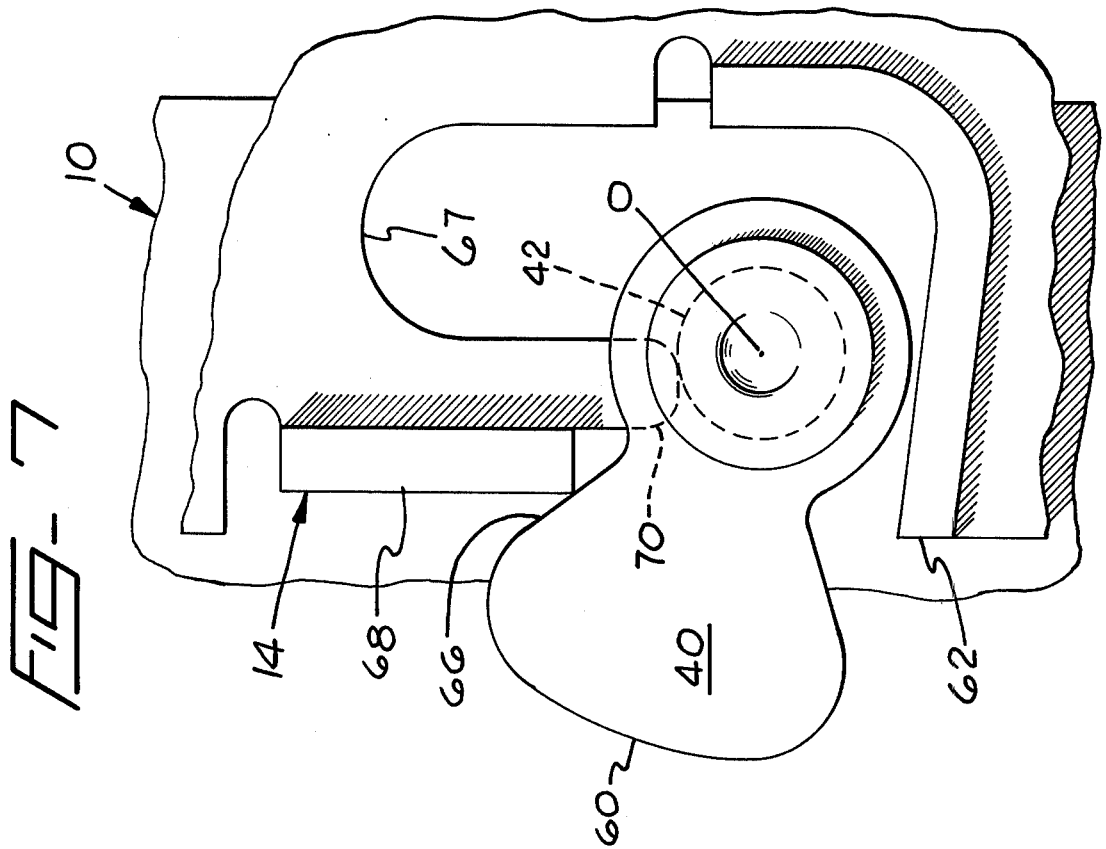
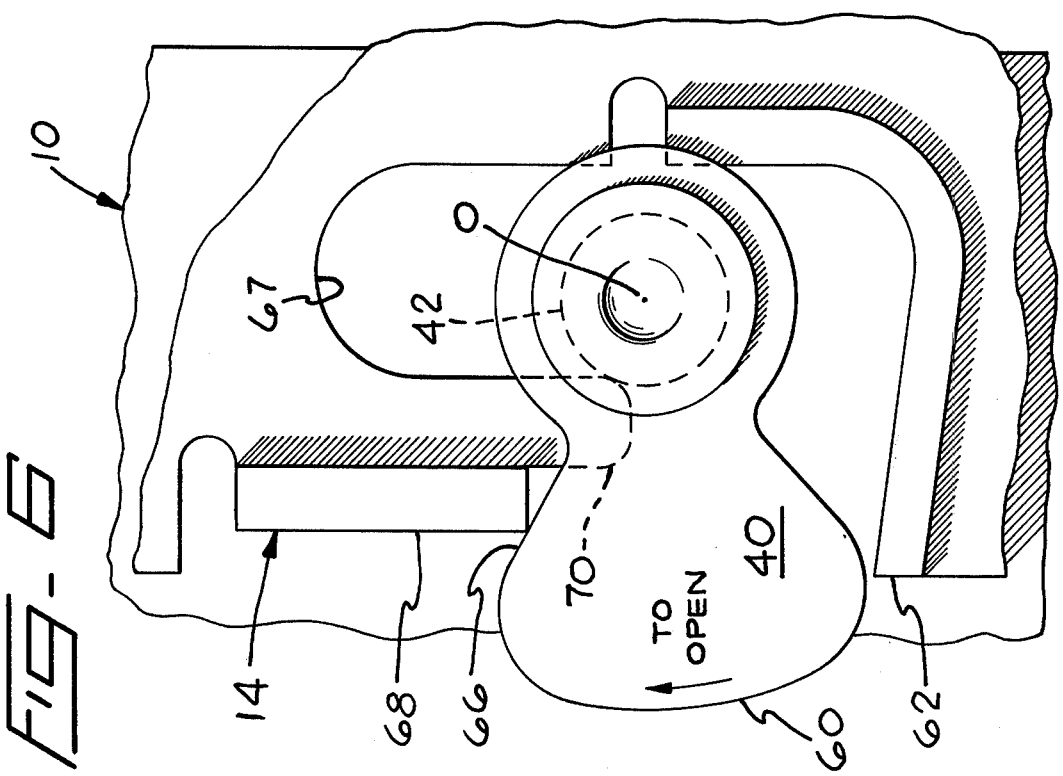

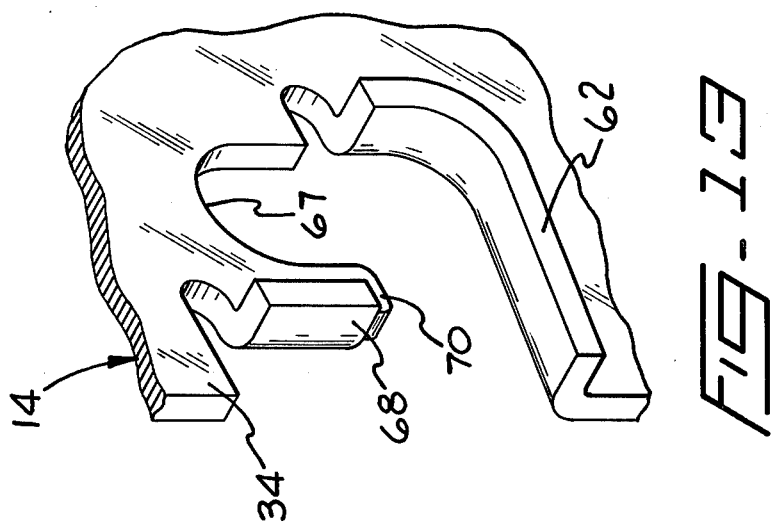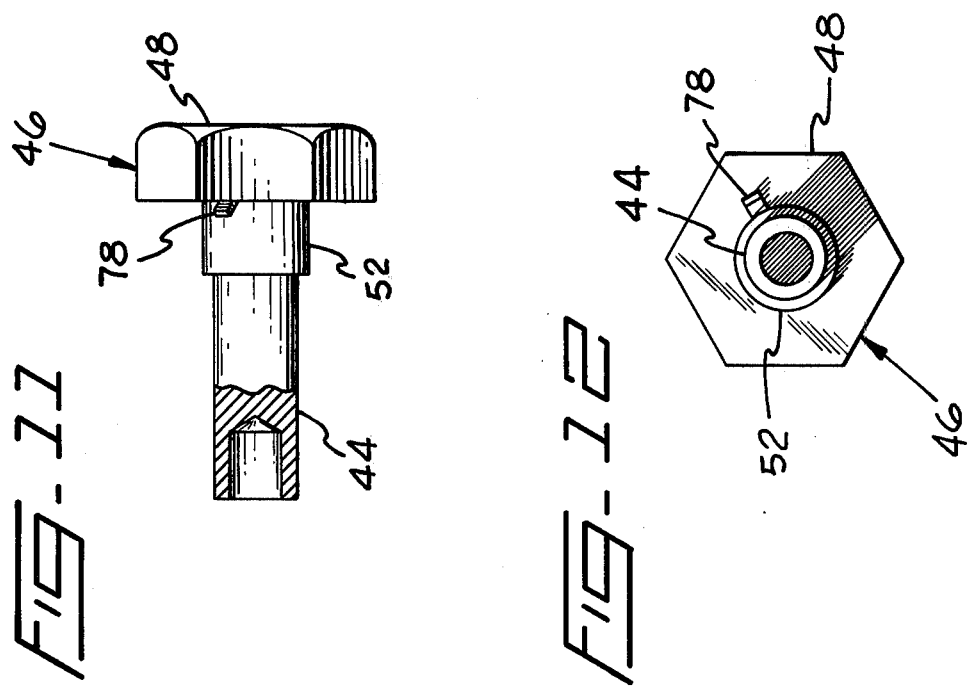

SELF-LOCKING DEVICES

FIELD OF THE INVENTION

The present invention relates to improved self-locking devices, and more particularly is concerned with improved self-locking devices which are capable of very simply and very easily locking a movable structural member to a stationary structural member, or to another movable structural member, and subsequently very simply and very easily unlocking such structural members in an uncomplicated fashion. Even more particularly, the present invention relates to improved self-locking devices for locking or for unlocking access members, such as covers, doors, panels, and the like, which provide access or entry to various enclosures of all kinds and types.

BACKGROUND OF THE INVENTION

Self-locking devices for locking various structural members together and for subsequently unlocking them have been known and used for many years and there are many commercially successful self-locking devices which are currently available on the open market. However, there is always a need and desire to make these self-locking devices simpler and easier to operate, as well as more economical to manufacture and easier to maintain in use and in service. Also, there is always a need and a desire to make these self-locking devices more automatic and more self-actuating in their operation and more fool-proof and tamper-proof in their service and use.

PURPOSES AND OBJECTS OF THE INVENTION

It is therefore a principal purpose and object of the present invention to provide an improved self-locking device which is very simple and very easy to operate, very economical to manufacture, very easy to maintain in service and in use, automatic and self-actuating in its operation, and substantially fool-proof and tamper-proof in its use.

BRIEF SUMMARY OF THE INVENTION

It has been found that such principal purposes and objects of the present invention, as well as other principal purposes and objects which will become clear from a further reading and understanding of this specification, may be achieved by providing a self-locking device for locking a movable structural member to a stationary structural member, or to another movable structural member, or for unlocking the same, comprising a rotatable self-locking cam and an actuating means therefor; the rotatable self-locking cam being rotatably mounted on a first structural member and having (1) an arcuate surface thereon, capable of preventing movement of a movable structural member in a first or opening direction, and (2) a cam surface thereon, capable of moving the movable structural member in the first or opening direction; and the actuating means being capable of rotating the self-locking cam in an angular direction whereby the cam surface contacts an ear on the movable structural member to forcibly move it in the first or opening direction, while the arcuate surface is being simultaneously moved out of the way of the movable structural member, due to the angular rotation of the self-locking cam, to permit the movement of the movable structural member in the first or opening direction to unlock the movable structural member from the first structural member, and then, the ear on the movable structural member being subsequently capable of rotating the self-locking cam in an angular direction opposite to that of the first angular direction, whereby the movable structural member returns to its original locked position, wherein it is prevented from moving in the first or opening direction by the arcuate surface on the rotatable self-locking cam.

Although the present inventive concept will be described and illustrated in greater particularity with reference to aboveground connection and splice enclosures or other terminal enclosures for buried communication or power cable installations, or the like, it is to be appreciated that the principles of the present inventive concept are equally applicable to other enclosures of all types and kinds, including, for example, chambers, compartments, chests, rooms, or other receptacles or containers, which it is desired or required to close and lock. As used herein, therefore, the terms "structural member," "enclosure member," or "access member" are intended to include such elements as covers, panels, doors, walls, barriers, frames, and the like, which may be slidable, or rotatable, or hinged, or otherwise constructed, which are used to form the elements of enclosures or are used to provide entry or access to such enclosures.

BRIEF DESCRIPTION OF THE DRAWINGS

In the following specification and accompanying self-explanatory drawings, there are described and illustrated preferred embodiments of the present inventive concept, but it is to be realized that the invention, in its broader aspects, is not to be construed as limited to such preferred embodiments as disclosed, except as determined by the spirit and the scope of the appended claims.

Referring to the accompanying self-explanatory drawings,

FIG. 1 is a fragmentary perspective view of a part of the back cover and the lower front cover of an aboveground terminal enclosure for buried communication cable or power installations, employing the principles of the present invention, with the upper front cover and the cap removed;

FIG. 2 is a perspective view, showing the upper front cover of the terminal enclosure of FIG. 1, as removed from the back cover thereof;

FIG. 3 is a perspective view, showing the cap of the terminal enclosure of FIG. 1, as removed from the top thereof;

FIG. 4 is a fragmentary, schematic and diagrammatic elevational view of a preferred embodiment of the improved self-locking device of the present invention in its fully closed and locked position, as viewed from within the interior of the terminal enclosure;

FIGS. 5, 6 and 7 are fragmentary, schematic and diagrammatic elevational views of the preferred embodiment of the improved self-locking device of the present invention, as illustrated in FIG. 4, but progressing successively and sequentially to other opening positions wherein (1) slack has been removed from between cooperating parts; (2) the terminal enclosure is still locked but is partially open; and (3) the terminal enclosure is unlocked and is ready to be opened fully, respectively;

FIG. 11 is a side elevational detail view, showing the actuating tubular shoulder rivet employed in the application of the principles of the present invention, before it has been assembled and secured to the self-locking cam and hub;

FIG. 12 is an end elevational detail view, showing the actuating tubular shoulder rivet of FIG. 11, as viewed from the shank end; and FIG. 13 is a fragmentary perspective showing of the operating ears and the related portions of the movable upper front cover of the terminal enclosure of the present invention.

Figure 9:
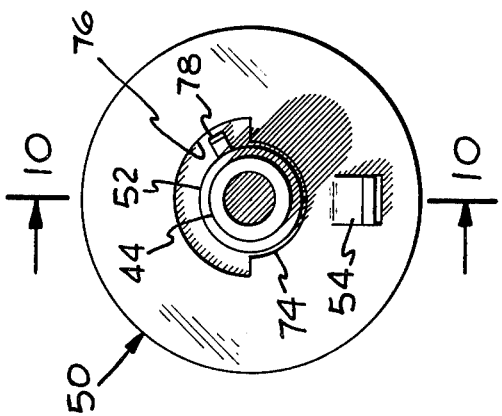
FIG. 9 is a fragmentary side elevational detail view, showing the annular cup washer employed in the application of the principles of the present invention.

The various scales to which these Figures have been drawn are not the same in all cases; some have been drawn to larger scales and others have been drawn to smaller scales. The smaller elements of the improved self-locking device have been drawn to larger scales in order to bring out more clearly the details of such smaller elements. The larger elements of the self-locking device have been drawn to smaller scales, primarily for accomodation purposes to fit the size of the sheet of drawing material.

Additionally, some of the detail views of the smaller elements have been rotated slightly out of their normal operating positions in order to more clearly illustrate the detailed constructions of such smaller elements.

FIGS. 1 to 3 have been drawn approximately 1/6× scale. FIGS. 4 through have been drawn approximately 5× scale. FIGS. 9 to 12 have been drawn approximately 3× scale. FIG. 13 has been drawn approximately 4× scale.

Additionally, it is to be observed that in some of the drawings, such as FIGS. 4 through 7, for example, some of the lesser important parts and elements have been omitted, purely in the interests of providing a clearer and more easily understandable illustration.

DESCRIPTION OF THE PREFERRED EMBODIMENT

With particular reference to FIGS. 1 through 3 of the drawings, there is shown an above-ground terminal enclosure comprising a partially-buried back-cover 10; a partially-buried lower front cover 12; an upper front cover 14 which is removable from the back cover 10 and the lower front cover 12; and a cover 16 which is adapted to fit over to cover and protect the upper ends of the back cover 10 and the upper front cover 14 and to keep rain, snow, sleet, etc., from the interior of the terminal enclosure, when it is assembled and in service and use.

The back cover 10 is a substantially U-shaped channel member and comprises a rear wall 18 and a pair of laterally extending side flanges 20, 22 which are approximately at right angles to the rear wall 18.

The lower front cover 12 is also a substantially U-shaped channel member and comprises a lower front wall 24 and a pair of laterally extending side flanges 26, 28 which are approximately at right angles to the lower front wall 24.

The back cover 10 and the lower front cover 12 are adapted to fit together and to be bolted together, or otherwise secured to each other, as shown, to form an elongated, lower enclosure compartment in which communication or power cables, terminals, and related equipment is contained.

The lower front cover 12 may be separated from the back cover 10, if desired or required, but, once the communication or the power cables, terminals, and other equipment and parts have been installed and the lower front cover 12 and the back cover are secured together and partially buried in the ground to a depth, such as shown in FIG. 1, the lower front cover 12 and the back cover 10 are normally not separated for service, maintenance, inspection, or for other purposes.

The upper front cover 14 is similarily a substantially U-shaped channel member and comprises an upper front wall 30 and a pair of laterally extending side flanges 32, 34 which are substantially at right angles to the upper front wall 30. The upper front cover 14 has approximately the same horizontal-plane cross-section as the lower front cover 12 and, when assembled together in use, forms generally an extension of the lower front cover 12. The upper front cover 14 is adapted to fit together with the upper portion of the back cover 10 to define an elongated upper enclosure compartment in which communication or power cables, terminals, and related equipment and arts is contained.

The upper front cover 14 and the back cover 10 are not permanently secured together, as by bolting, but are adapted to be held together by means including a pair of laterally projecting lanced tabs, pins, or shoulder rivets 36, 36 and a pair of cooperating guiding and locking slots 38, 38 and to be locked in such a configuration, or opened, by means about to be described more fully hereinafter. Such opening of the interior of the terminal enclosure is, of course, accomplished by unlocking and removing the upper front cover 14 from the back cover 10.

A third lanced tab or shoulder rivet 36' and an angularly disposed guiding and locking slot 38' are provided on the back cover and on the lower portion of the upper front cover 14, respectively. As noted in FIG. 2, the guiding and locking slot 38' is disposed at approximately an angle of about 45° upwardly with respect to the edge of the flange 32 of the movable upper front cover 14.

Such angularity of the guiding and locking slot 38' is desirable at the lower end of the movable upper front cover 14, inasmuch as, during the opening of the terminal enclosure, the lower portion of the upper front cover 14 is allowed a definite outward movement away from the back cover 10, in addition to an upward movement. And, during the closing of the terminal enclosure, the guiding and locking slot 38' guides the upper front cover 14 downwardly and inwardly to engage and properly actuate the self-locking cam 40.

During such opening and closing movements, the inward and outward movements of the upper portion of the upper front cover 14 are much less marked and the standard or conventional guiding and locking slots 38, 38 are satisfactory thereat.

The side flanges 32, 34 of the upper front cover 14 are each provided with inwardly directed off-set portions 33, 33 and corner cut-out portions which permit these flanges 32, 34 to nest and to fit within the side flanges 20, 22 of the back cover 10. Such an overlapping, nesting arrangement adds to the tamper-proof and the weather-proof features of the terminal enclosure.

The cap 16 has a horizontal-plane cross-section which is approximately rectangular or square and is adapted to fit over the upper ends of the back cover 10 and the upper front cover 14, when they are assembled and in use, to protect and cover them and the terminal enclosure from the elements. The cap 16 may be a separate part but, preferably, it is permanently secured in position to the top of either the back cover 10 or the upper front cover 14 to prevent it from being lost or misplaced and to facilitate and to expedite the assembly of the upper front cover 14 to the back cover 10.

It is to be realized that, if the laterally projecting lanced tabs, pins, or shoulder rivets 36, 36, 36' and the guiding and locking slots 38, 38, 38' were the sole means of holding and locking the upper front cover 14 in position with respect to the back cover 10 during use, anyone, whether authorized or unauthorized, but with sufficient curiosity or with vandalism in mind, could easily gain access to the interior of the terminal enclosure by simply lifting up and removing the upper front cover 14. Such is, of course, highly undesirable. Therefore, an automatically-operable, self-actuating locking means is additionally provided to easily and to simply secure and lock the upper front cover 14 in position with respect to the back cover 10 during use and to easily and simply unlock these members to open the terminal enclosure for service, or maintenance, or for any other purpose. Such is naturally very highly desirable to insure the safety and the security and the protection of the equipment and the parts in the terminal enclosure and to enhance its tamper-proof and vandalism-proof features.

THE IMPROVED SELF-LOCKING DEVICE

As noted primarily in FIGS. 4 and 8, an easily unlocking and opening and subsequently automatically self-actuating locking device is provided for the terminal enclosure and comprises, as its main operating elements, a rotatable self-locking cam 40 and an actuating tubular shoulder rivet 46 having a hexagonal head 48.

Figure 8:
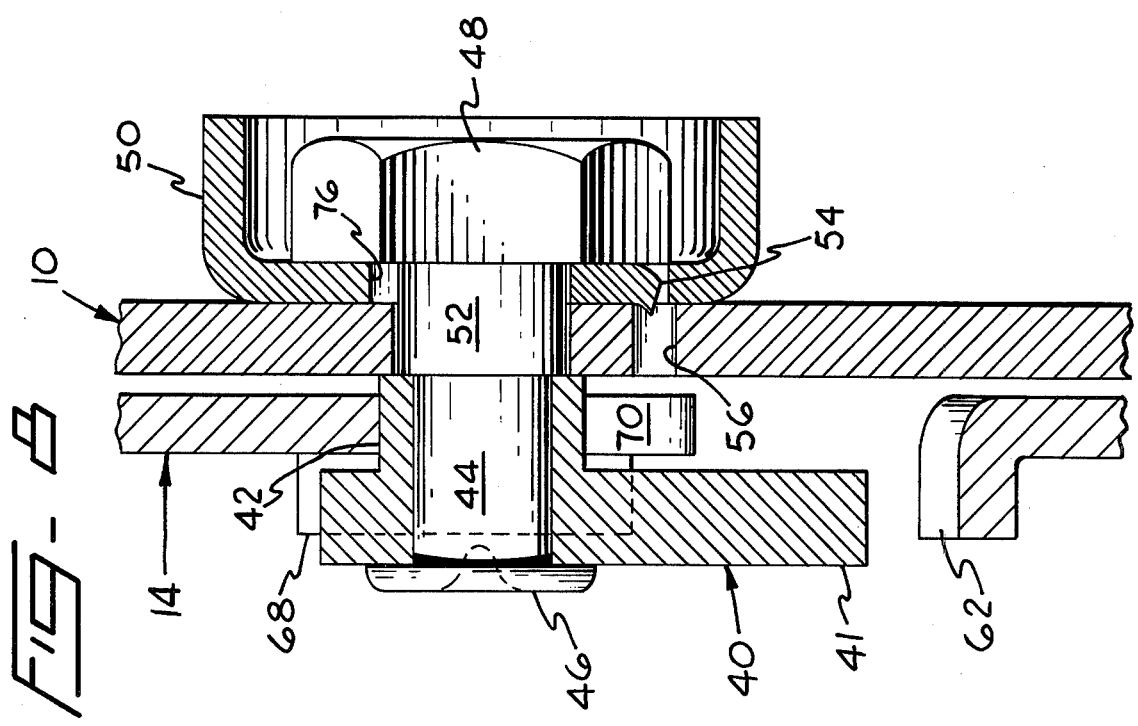
FIG. 8 is a fragmentary cross-sectional view, taken on the line 8—8 of FIG. 4, show the internal construction of the actuating means which rotates the self-locking cam and hub of the improved self-locking device of the present invention.

The cam 40 comprises a larger main cam portion 41 which somewhat very generally resembles a figure-8 configuration and a smaller, cylindrical hub portion 42. The cam 40 and its hub 42 are very securely, non-rotationally mounted on a smaller cylindrical shank portion 44 of the tubular shoulder rivet 46 and are adapted to rotate positively therewith. If desired, a more positive engagement between the self-locking cam 40 and the shank portion 44 may be employed, such as obtained by the use of splined shafts and fittings, Woodruff keys, and the like.

The hexagonal head 48 of the tubular shoulder rivet 46 fits within the recess of the walls of an annular cup washer 50. The tubular shoulder rivet 46 also has a larger cylindrical shank portion 52 which is rotatably mounted within a circular opening formed in the flamge 36 of the back cover 10. The other end of the tubular shoulder river 46 (the left hand end, as viewed in FIG. 8) is rolled or otherwise peened or flattened back against the surface of the side of the rotatable self-locking cam 40 and prevents slippage between the self-locking cam 40 and the tubular shoulder rivet.

The cup washer 50 is provided with a lanced, protruding tab 54 (also see FIGS. 9 and 10) which fits within an opening 56 formed in the flange 36 of the back cover 10 whereby, once the protruding tab 54 of the cup washer is fitted within the opening in the flange 36 of the back cover 10, further rotation of the cup washer 50 prevented. However, this does not prevent rotation of the tubular shoulder rivet 46 and the self-locking cam 40 and hub 42 securely mounted thereon. Consideration of FIGS. 4 and 8 will reveal that, when the hexagonal head 48 of the tubular shoulder rivet 46 is rotated, the self-locking cam 40 and its hub 42 are correspondingly rotated through the same degree of angular rotation.

The hexagonal head 48 of the tubular shoulder rivet 46 is a standard or conventional size but fits relatively closely within the walls of the annular cup washer 50 with a relatively small amount of clearance. As a result, a special wrench or other tool having relatively thin walls is required to fit into the cup washer 50 to grip and turn the hexagonal head 48. A standard on conventional size socket wrench or a box-end or open-end wrench or other standard or conventional wrench or tool cannot fit into the cup washer 50 to grip and turn the hexagonal head 48 of the tubular shoulder rivet 46 and thus the possibility of tampering and vandalism is considerably lessened. The use of this particular type of hexagonal head 48 and this specific form of security cup washer 50 is not necessary and any other tamper-proof head style or other security shape or form may be employed. For example, a tubular shoulder rivet or equivalent element having a pair of small holes in its top surface suitable for cooperating with the projecting pins of a spanner wrench or equivalent tool would also be suitable.

It is therefore apparent from FIG. 8 that a person having the required special wrench or tool capable of fitting within the cup washer 50 and gripping and turning the hexagonal head 48 of the tubular shoulder rivet 46 can rotate it and the self-locking cam 40 and hub 42 mounted thereon. Such a simple and uncomplicated actuating means is all that is required to set in operation the functioning of the unlocking and opening of the terminal enclosure.

In FIG. 4, the terminl enclosure utilizing the rotatable self-locking cam 40 is shown in the fully closed or locked position. In such a position, the long, main axis of the self-locking cam 40 passing through its center of rotation O is shown at an angle of about 16° as measured clockwise from the vertical direction. This is the specific illustrated configuration of FIG. 4 but it is to be appreciated that the fully closed or locked position may still be retained with the self-locking cam 40 at angular positions of from about 12° to about 24° as measured clockwise from the vertical direction. Other degrees and other ranges of degrees are, of course, possible with other shapes and designs of cams and with types and forms of terminal enclosures.

THE ROTATABLE SELF-LOCKING CAM

As noted especially in FIG. 4, the self-locking cam 40 possesses a somewhat generally figure-8 configuration. The self-locking cam 40 is capable of rotation about its center O, when so urged by the actuating tubular rivet 46. The bottom, or farthest-out portion, of the self-locking cam 40 is a relatively smooth curved or arcuate surface 60 which, in this particular embodiment, is the arc of a circle having the point O as its center. Directly below and facing the curved or arcuate surface 60 of the self-locking cam 40 is a cooperating surface 62 of the upper front cover 14 in the form of a lower ear or tab which is formed generally perpendicularly outwardly from the main material of the upper front cover 14, as seen more clearly in the perspective view of FIG. 13.

If an unauthorized person were to try to open the terminal enclosure by forcibly pushing upwardly on the upper front cover 14, the lower ear or tab 62 would be moved upwardly to butt against the curved or arcuate surface 60 of the self-locking cam 40. In FIG. 4, it is to be observed that the upper surface of the lower ear or tab 62 is inclined downwardly in a clockwise direction about 7° below the horizontal. The point of contact between the upper surface of the lower ear or tab 62 and the lower curved or arcuate surface 60 of the self-locking cam 40 is thus so located that the external force exerted by the unauthorized person in forcibly lifting the upper front cover 14 is transmitted angularly upwardly towards the center O of the self-locking cam 40, exerts substantially no rotational force thereon, and merely locks the two surfaces 60 and 62 together which tends to keep closed and locked the terminal enclosure.

The specific angle of 7° below the horizontal direction is not critical and it may be increased to 20° or 30° or even more, or it may be decreased to 0° or even to 20° or 30° or even more above the horizontal direction, if so desired or required. However, such increased angles tend to introduce clearance difficulties and it is preferred to keep such angle in the range of from about 0° to about 15° as measured clockwise below the horizontal.

It is to be noted that, at all the above angles, the line of the transmitted forces created by the unauthorized efforts to raise the upper front cover 14 will directly or approximately pass through the center O of the self-locking cam 40 and that substantially no rotational force or couple will be created thereon. As a result, there will be no tendency at all on the part of the self-locking cam 40 to rotate in either direction, much less to tend to open the terminal enclosure.

It is possible, however, that, through the inevitable wear and tear that takes place on the various parts of the terminal enclosure, or perhaps due to the fact that the assembly of the various parts of the self-locking device may not have been perfectly precise in every instance, or for any other reason, the line of the transmitted force exerted by the unauthorized efforts to open the terminal enclosure does not pass exactly through the center O but passes to the right or to the left of the center O, as viewed in FIGS. 4–7.

If it passes to the right of the center O, this will create no problem as such will tend only to create a rotational force in the nature of a couple tending to rotate the self-locking cam 40 in a counterclockwise direction which tends to close or to keep closed the terminal enclosure.

On the other hand, if the line of the transmitted force were to pass to the left of the center O, although such would tend to create a rotational force in the nature of a couple tending to rotate the self-locking cam 40 in a clockwise direction tending to open the terminal enclosure, such couple is not large enough in magnitude as to overcome the frictional, inertial, or other forces tending to keep the self-locking cam at rest.

It is thus seen that the upper front cover 14 can be securely held in a closed and locked condition on the back cover 10 and is capable of resisting unauthorized efforts made externally of the terminal enclosure to open it, unless the person seeding to open it has the necessary special wrench or tool. The interior of the terminal enclosure is thus deemed to be safely locked and secure.

THE OPENING OPERATION

If it is desired to move the upper front cover 14 upwardly and then to the right, as viewed in FIGS. 4–7, in order to unlock and to open the upper compartment of the terminal enclosure for service, maintenance, inspection, or for any purpose whatsoever, such is accomplished by a relatively simple and easy procedure.

A special wrench or tool is fitted within the recess of the cup washer 50 to grip the hexagonal head 48 of the tubular shoulder rivet 46 and to turn it and the self-locking cam 40 mounted thereon in a clockwise direction, as viewed in FIGS. 4–7.

The first rotational movement of the self-locking cam 40 takes up any slack which may be present. It most cases, it will be about 0°, or perhaps a very low angular value. In FIG. 4, as drawn, it is about 6° and, as shown in FIG. 5, the slack is very quickly taken up and an actuating cam surface 66 on the self-locking cam 40 is rotated to butt against the corner of an upper ear 68 of the movable upper front cover 14. Up to this time, the movable upper front cover 14 has not moved upwardly or in any direction.

The next clockwise rotational movement of the self-locking cam 40 forcibly elevates the upper ear of the movable upper front cover 14, as shown in FIG. 6, whereby the upper front cover 14 moves upwardly in an opening direction. Also, due to the nature and the curvature of the actuating cam surface 66, the movable upper front cover 14 moves slightly to the right, which is also in the opening direction. By this time, the self-locking cam 40 has rotated through a substantial angle which, in FIG. 6, is about 69°.

A lower projecting end portion 70 of the movable upper front cover 14 which is immediately adjacent the upper ear 68, however, continues to ride against the surface of the outer periphery of the hub 42 of the self-locking cam 40 and thus further movement of the movable upper front cover 14 to the right or in the opening direction is restricted. The terminal enclosure is therefore only partially open at this point in the configuration shown in FIG. 6. And, of course, it is still in a locked condition.

It is also to be observed that, during this time, the main body of the rotatable self-locking cam 40 has been rotating or moving out of the way of the upwardly-moving surface 62 of the upper front cover 14, so that the lower locking surface 60 of the self-locking cam 40 no longer is in a position as to hold and prevent further upward movement of the upper front cover 14. Such action takes place simultaneously and automatically with the rotational movement of the self-locking cam 40.

Continued additional angular rotation of the self-locking cam 40 by the actuating tubular shoulder rivet 46 continues to forcibly elevate the upper ear of the upper front cover 14, as now shown in FIG. 7, whereby the upper front cover 14 continues to rise upwardly and to move to the right until the lower projecting end portion 70 of the upper front cover 14 is high enough to slide over the top of the outer cylindrical periphery of the hub 42 of the self-locking cam 40.

As a result, the upper front cover 14 is unlocked and is released from the grip of the hub 42 of the self-locking cam 40 and is free to be moved to the right as far as desired to remove the upper front cover 14 from the back cover 10, and, of course, to open the interior of the terminal enclosure for service, maintenance, etc.

By this time, the self-locking cam 40 has been rotated by the actuating tubular shoulder rivet 46 through a total angle of about 90° but it is to be pointed out that this specific angle of 90° is not essential or critical in any way. It is actually more dependent upon the nature and physical characteristics and shape of the cam surface 66 of the self-locking cam 40, the configuration and the positioning of the upper ear 68, the shape and the length of the projecting end portion 70 of the upper front cover 14, the diameter of the hub 42 of the self-locking cam 40, and so forth. Other designs of such elements can be used to decrease such required rotational angle to as little as about 50° or, if desired, increase it to as much as about 150°, or more. Lower degrees of angular rotational movement are normally preferred.

Additional rotational movement of the self-locking cam 40 by the actuating tubular shoulder rivet 46 beyond the position shown in FIG. 7 will forcibly urge the upper front cover 14 even more in the right hand or opening direction, whereby the lower edge of the upper front cover 14 will be pushed even more away from the back cover 10, thus providing plenty of room and finger space for the workman to grasp the lower edges of the upper front cover 14 to remove it from the back cover 10. The hazard of finger-pinching or finger-nail crushing is therefore virtually eliminated.

It is thus seen that all that is required in order to unlock and open the terminal enclosure is to insert the special wrench or tool into the cup washer 50 to grip and turn the actuating tubular shoulder rivet 46 through the required angle, whereby the upper front cover 14 is freed of all the restraints holding it in a closed or locked condition and is capable of being simply and easily removed from the back cover to open the terminal enclosure.

The extent of the movement of the upper front cover 14 upwardly and to the right, as created by the rotation of the self-locking cam 40, depends upon the relationship of the various mechanical parts and elements previously mentioned and is normally in the range of an upward movement of from about 5/16 inch to about 13/16 inch and a right-hand movement of from about ⅛ inch to about 1¼ inches. In the specific case of the preferred embodiment, as shown in the drawings, these movements are, respectively, about 7/16 inch and from about 1/6 inch to about ⅞ inch, depending on the extent of the rotation of the self-locking cam 40 by the special wrench or tool beyond the position shown in FIG. 7. All these measurements are taken at the lower edge of the upper front cover 14 which is normally the place where the workman will grasp the upper front cover 14 in order to open the terminal enclosure.

For reasons which will become clearer from a further reading of this specification, it is normally desired that the rotation of the self-locking cam 40 be kept within certain limits, so that, when the upper front cover 14 is removed from the back cover 10, the self-locking cam 40 is either in the position shown in FIG. 7, or within a prescribed degree of angularity from such position, as limited by means provided for such purpose. This is done so the subsequent closing and locking of the terminal enclosure place easily, simply and without requiring special adjustment.

This is accomplished by means of a feature on the cup washer 50 and the tubular shoulder rivet 46, as best shown in FIGS. 9–12. The cup washer 50 has a central opening 74, through which the tubular shoulder rivet 46 is adapted to pass. This central opening 74 is provided with an additional arcuate or semi-annular cut-out portion 76. And the tubular shoulder rivet 46 is provided with an additional spur or tab 74 which is adapted to fit slidably in the arcuate or semi-annular cut-out portion 76.

Figure 10:
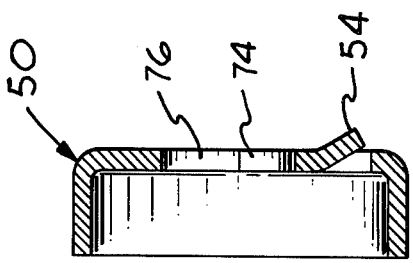
FIG. 10 is a fragmentary end elevational detail view, showing in cross-sectional view, the annular cup washer of FIG. 9, taken on the line 10—10 of FIG. 9, in the direction indicated by the pair of arrows.

The cup washer 50 is locked to the back cover 10 and is prevented from rotating by the tab 54 fitting within the opening 56 in the back cover 10. The larger shank 52 of the tubular shoulder rivet 46 with the tab 78 thereon is rotational but its rotation is limited by the extent of the sliding movement of the tab 78 in the semi-annular cut-out portion 76. As shown in FIG. 10, the cut-out portion extends for about 180° but such angle is not critical and may be in the range of from about 50° to about 270°, depending upon the particular circumstances and conditions which are involved. Normally, however, a range for the cut-out portion 76 is in the range of of from about 150° to about 210°.

THE CLOSING OPERATION

After the upper front cover 14 has been removed and the necessary work, servicing, maintenance, etc., has been completed, a very simple procedure is instituted in replacing and re-locking the upper front cover 14 to close and lock the terminal enclosure.

The upper front cover 14 is returned to the position shown in FIG. 7 and, if its weight is sufficient, it is simply allowed to drop inwardly and downwardly under the force of gravity to the closed and locked position of FIG. 4. However, if the weight of the upper front cover 14 is insufficient, or if the particular enclosure is not in a vertical position whereby the force of gravity cannot be utilized, then the upper front cover 14 is given a light push to institute the automatic and self-actuating closing operation. As will be seen, this downward movement is all that is required to close and lock the terminal enclosure. No additional other actions are required.

First, the upper ear 68 of the movable upper front cover 14 butts against the slanting cam surface 66 which, as described previously, is normally always in the angular position shown in FIG. 7, or not too distant angularly therefrom, as limited by the arcuate slot 76 and the tab 78 sliding therein. The self-locking cam 40 is then forcibly rotated by the upper ear 68 in a counterclockwise direction, as viewed in FIGS. 5–7, to pass through the angular position shown in FIG. 6, wherein it is now partially closed, rather than partially open. The rotation continues for the self-locking cam 40 to the angular position shown in FIG. 5 wherein the terminal enclosure is considered fully closed and securely locked.

It occasionally happens that, during the time that the workman is working on the equipment inside the terminal enclosure, the self-locking cam 40 is rotated counterclockwise from the position shown in FIG. 7, such as by accidentally pushed or knocked by the workman, so that it is in an angular position similar to that of FIG. 4, at the time that the workman starts to close the terminal enclosure by re-positioning the upper front cover 14 and giving it a light push to institute the closing operation.

This time, it is the lower ear 62 of the upper front cover 14 that butts against the back face or rear surface of the self-locking cam 40 to rotate it in a clockwise direction to approximately the angular position of FIG. 6 and, from then on, the closing operation proceeds as previously described.

And that is all that is required for the closing operation which, as noted, proceeds automatically and in self-actuating fashion, once the movable upper front cover 14 is placed in the proper position.

During such self-actuating rotation of the self-locking cam 40, the the curved lowermost surface 60 of the self-locking cam 40 swings downwardly from its outermost position of FIG. 7, through its intermediate position of FIG. 6, to end up in the angular position shown in FIG. 5 wherein it is again in position as to be capable of blocking and preventing any upward movement of the upper front cover 14, if and when such upward movement is brought about by someone who does not have a special wrench or tool and is merely physically pushing on the the upper front cover 14 in an upward direction in an effort to gain unauthorized access to the interior of the terminal enclosure.

The lowermost closed position of the upper front cover 14 is determined either by an arcuate portion 67 of the upper front cover 14 coming to rest on the top of the hub 42, or by the pins 36, 36, 36' coming to rest on the deepest end of the slots 38, 38, 38'. In any event, the lower portion 70 of the upper front cover 14 is well below the top surface of the hub 42 to prevent an opening movement to the right and the lowermost curved surface of the self-locking cam 40 opposes the lower ear 62 of the upper front cover 14 to prevent any upward opening movement.

This invention provides for a simple and easy closing and locking of the terminal enclosure; renders such closing and locking substantially self-actuating and self-locking; permits easy field inspections from a distance to determine if the terminal enclosure is locked, since the mere positioning of the upper front cover 14 in its lowermost position shows a locked condition; and, further, it virtually eliminates the possibility of workmen forgetting to close and lock the terminal enclosure after completion of work. If desired, special markings may be placed on the terminal enclosure to indicate the upper or unlocked condition and the lower or locked condition of the terminal enclosure.

The present inventive concept will be described in greater detail by reference to the following specific Examples, wherein there are described preferred embodiments of the present inventive concept. However, it is to be appreciated that such Examples are given primarily for illustrative purposes and are not to be construed as limitative of the broader aspects of the invention.

EXAMPLE I

The self-locking device illustrated in FIGS. 1–13 of the drawings is used for this Example. The back cover is about 48 inches long and has a rear wall of about 6 inches and side flanges of about 3½ inches each (all outside dimensions). The lower front cover is about 24 inches long and has a front wall of about 6 inches and side flanges of about 3½ inches each (all outside dimensions).

The lower front cover is secured to the back cover, with their lower ends about even, and they are buried to a depth of about 19 inches, leaving about 29 inches of the back cover above ground and about 5 inches of the lower front cover above ground.

The upper front cover is about 24 inches long and has a front wall of about 6 inches and side flanges of about 3½ inches each (all outside dimensions). There are slight off-set portions on both the lower front cover and the upper front cover so that they can nest within the side flanges of the back cover. The upper front cover is made of 14 gage steel, is galvanized, and has a weight of about 6 pounds.

The cap has a horizontal-plane cross-section of about 6 by 6 inches square and has a depth of about 2 inches (all outside dimensions). The cap fits over the top portions of the back cover and the upper front cover, when they are assembled in use. The cap is secured to the back cover by riveting to prevent it from lost or misplaced in service and to prevent persons from merely lifting up the top to gain access to the terminal enclosure that way.

The upper ear of the movable upper front cover is formed substantially perpendicularly out of the main plane of the flange of the upper front cover, so that it protrudes about ⅛ inch out of such plane.

The lower ear of the movable upper front cover is formed substantially perpendicularly out of the main plane of the flange of the upper front cover, so that it protrudes about ⅛ inch out of such plane. It is about 7° clockwise downwardly below the horizontal.

The long axis, that is, the longest dimension, of the self-locking cam is about 11/16 inch. The diameter of the hub of the self-acting cam is about 1/4 inch. The curved lowermost surface of the self-acting cam is an arc of a circle having the center of rotation of the self-locking cam as a center.

Repeated efforts to unlock and open the terminal enclosure by pushing upwards strongly on the upper front cover fail. The terminal enclosure is closed and locked securely.

A special wrench is fitted into the recess of the cup washer to grip the hexagonal head of the actuating tubular shoulder rivet to turn it, whereby the self-locking cam and its hub are actuated to rotate in similar fashion. A rotation of about 90° is required to unlock the upper front cover from the back cover. During such rotation of the self-locking cam, the upper front cover is raised about ½ inch and is moved to the right a distance of about 1/6 inch. Continued rotation of the tubular shoulder rivet and the self-locking cam moves the lower edge of the upper front cover more to the right for a total movement of about ⅞ inch. The lower edge of the upper front cover is then gripped by the fingers and is raised and removed from the back cover to open the terminal enclosure.

After the necessary work has been completed inside the terminal enclosure, the upper front cover is returned to approximately the position of FIG. 7 and is given a light push. The upper front cover slips down into position and the terminal enclosure is closed and locked securely. The special wrench is not required during the closing and locking of the terminal enclosure. It is automatic and self actuating, once the upper front cover is placed in the proper position and given a light push.

EXAMPLE II

The procedures described in Example I are followed substantially as set forth therein, with the exception that the lower ear of the upper front cover is disposed substantially horizontally, rather than being inclined downwardly in a clockwise direction about 7° below the horizontal. Efforts to open thee terminal enclosure again fail. The locking action between the lower ear of the upper front cover and the lower surface of the self-acting cam is sufficient.

EXAMPLE III

The procedures described in Example I are followed substantially as set forth therein, with the exception that the lower ear of the upper front cover is disposed at an angle which is inclined upwardly in a counterclockwise direction of about 7° above the horizontal. Efforts to open the terminal enclosure again fail. The locking action between the lower ear of the upper front cover and the lower surface of the self-locking cam is sufficient.

EXAMPLE IV

The procedures described in Example 1 are followed substantially as set forth therein, with the exception that, after the necessary work has been completed inside the terminal enclosure and before any effort is made to close the terminal enclosure, the self-locking cam is deliberately rotated counterclockwise from the position of FIG. 7 in which the major axis of the self-locking cam is at an angle of about 17° downwardly clockwise below the horizontal to a position in which the major axis of the self-locking cam is at an angle of about 66° upwardly counterclockwise above the horizontal. This new position is approximately the angular configuration of the self-locking cam of FIG. 5.

No difficulty is encountered in subsequently closing and locking the terminal enclosure. The lower ear of the upper front cover initially butts against the rear surface of the self-locking cam and moves it angularly in a clockwise direction until the upper ear of the upper front cover takes over and completes the closing and locking operation.

Although only a few specific Examples of the present invention have been described, it is to be recognized that the broader aspects of the present invention are not to be construed as limited to the specific designs and configurations disclosed therein, but to include various other equivalent features, as set forth and included in the spirit and the scope of the appended claims.

What is claimed is:

1. A self-locking device for locking a movable structural member to a stationary structural member, or to another movable structural member, or for unlocking the same, comprising: a first structural member; a second structural member which is movable in a first or opening direction; a rotatable self-locking cam; an actuating means capable of rotating said self-locking cam, said rotatable self-locking cam being rotatably mounted on said first structural member; a curved surface on said rotatable self-locking cam, capable of contacting and preventing movement of said second structural member in said first or opening direction; a cam surface on said rotatable self-locking cam, capable of contacting and moving said second structural member in said first or opening direction; an ear on said second structural member, said actuating means being capable of rotating said rotatable self-locking cam in an angular direction, whereby said cam surface on aid rotatable self-locking cam contacts said ear on said second structural membr to forcibly move said second structural member in said first or opening direction, while said curved surface on said rotatable self-locking cam is being simultaneously moved out of the way of said second structural member due to the angular rotation of said rotatable self-locking cam, to permit the movement of said second structural member in said first of opening direction to move and to unlock said second structural member from said first structural member; angular rotation limiting means having surfaces located from about 120° to about 270° and being on said first structural member to limit the angular rotation of said rotatable self-locking cam within a prescribed degree of angularity, said surfaces being located such that said rotatable self-locking cam is always in an operative position when in its open position for selfclosing and locking of said self-locking device, and then, said ear on said second structural member subsequently becoming an actuating means during the closing and locking of said second structural member to said first structural member and being capable of rotating said rotatable self-locking cam in an angular direction opposite to that of said first angular direction, whereby said second structural member returns to its original closed and locked position, wherein it is prevented from movement in said first or opening direction by said curved surface on said rotatble self-locking cam.

2. The self-locking device defined in claim 1, wherein said second structural member is a movable member.

3. The self-locking device defined in claim 1, wherein said second structural member is a movable upper front cover on a terminal enclosure.

4. The self-locking device defined in claim 1, wherein said second structural member is a movable member and said first structural member is a stationary member.

5. The self-locking device defined in claim 1, wherein said second structural member is a movable upper front cover of a terminal enclosure and said first structural member is a back cover of a terminal enclosure.

6. The self-locking device defined in claim 1, wherein a second or lower ear is provided on said second structural member to cooperate with said curved surface on said rotatable self-locking cam to prevent movement of said econd structural member in said first or opening direction.

7. The self-locking device defined in claim 6, wherein said second or lower ear on said second structural member is positioned at an angle of from about 0° to about 15° as measured clockwise below the horizontal and is capable of contacting said curved surface on said rotatable self-locking cam at such an angle as to create a force directed essentially at the center of rotation of said self-locking cam, whereby substantially no rotational force is exerted on said self-locking cam.

8. The self-locking device defined in claim 6, wherein said second or lower ear on said second structural member is positioned at an angle of from about 7° to about 30° as measured clockwise below the horizontal and is capable of contacting said curved surface on said rotatable self-locking cam at such an angle as to create a rotational force thereon in the nature of a couple tending to rotate said self-locking cam in an angular direction opposite to that of said first or opening direction.

9. The self-locking device defined in claim 6, wherein said second or lower ear on said second structural member is positioned at an angle of from about 7° as measured clockwise below the horizontal to about 30° as measured above the horizontal and is capable of contacting said curved surface on said self-locking cam at such an angle as to create a rotational force thereon in the nature of a couple tending to rotate said self-locking cam in said first or opening direction but being too small in magnitude as to overcome the frictional, inertial, or other forces present, whereby no rotation of said self-locking cam results.

10. The self-locking device defined in claim 6, wherein the outermost portion of said second or lower ear is disposed at an angle of from about 20° above the horizontal to about 20° below the horizontal.

11. The self-locking device defined in claim 6, wherein the outermost portion of said second or lower ear is disposed at an angle of from about 7° above the horizontal to about 7° below the horizontal.

12. The self-locking device defined in claim 1, wherein said rotatable self-locking cam is capable of moving said second structural member in an upward and opening direction towards an opened and unlocked configuration.

13. The self-locking device defined in claim 1, wherein said rotatable self-locking cam is rotated through an angle of from about 60° to about 180° during the unlocking of said second structural member from said first structural member.

14. The self-locking device defined in claim 1, wherein said rotatable self-locking cam is rotated through an angle of from about 75° to about 105° during the unlocking of said second structural member from said first structural member.

15. The self-locking device defined in claim 1, wherein said angular rotation limiting means comprises a slot and a cooperating tab formed on said actuating means, said tab sliding within said slot to limit the rotation of said rotatable self-locking cam to an angle of from about 120° to about 270° during the unlocking and opening of said second structural member from said first structural member.

16. The self-locking device defined in claim 1, wherein said angular rotation limitation means comprises a slot and a cooperating tab formed on said actuating means, said tab sliding with said slot to limit the rotation of said rotatable self-locking cam to an angle of from about 150° to about 210° during the unlocking and opening of said second structural member from said first structural member.

* * * * *